US009205952B2

(12) United States Patent
Maas et al.

(10) Patent No.: US 9,205,952 B2
(45) Date of Patent: *Dec. 8, 2015

(54) COMPOSITE CONTAINER AND METHOD FOR MANUFACTURING SAME ("MULTI-LAYER PREFORM")

(71) Applicant: Dispensing Technologies B.V., DN Helmond (NL)

(72) Inventors: Wilhelmus Johannes Joseph Maas, Someren (NL); Dominicus Jan Van Wijk, Helmond (NL); Josephus Cornelius Snijders, Liessel (NL)

(73) Assignee: Dispensing Technologies B.V., Helmond (NL)

(*) Notice: Subject to any disclaimer, the term of this patent is extended or adjusted under 35 U.S.C. 154(b) by 0 days.

This patent is subject to a terminal disclaimer.

(21) Appl. No.: 14/290,249

(22) Filed: May 29, 2014

(65) Prior Publication Data

US 2014/0299565 A1      Oct. 9, 2014

Related U.S. Application Data

(63) Continuation of application No. 12/803,845, filed on Jul. 8, 2010, now Pat. No. 8,794,487, which is a continuation-in-part of application No. PCT/NL2009/000001, filed on Jan. 8, 2009.

(30) Foreign Application Priority Data

Jan. 8, 2008   (NL) ..................................... 1034895

(51) Int. Cl.
    *B65D 25/14*     (2006.01)
    *B65D 23/02*     (2006.01)
    (Continued)

(52) U.S. Cl.
    CPC ............ *B65D 23/02* (2013.01); *B29C 49/0073* (2013.01); *B29C 49/221* (2013.01); *B29C 65/5057* (2013.01); *B29C 65/52* (2013.01); *B29C 66/52272* (2013.01); *B29C 66/543* (2013.01); *B29C 66/545* (2013.01); *B65D 25/14* (2013.01); *B65D 83/0055* (2013.01); *B29B 11/08* (2013.01); *B29B 11/14* (2013.01); *B29B 2911/1402* (2013.01);
    (Continued)

(58) Field of Classification Search
    USPC .......... 222/105, 95, 386.5, 389, 399, 107, 94, 222/130; 156/242; 215/12.2
    See application file for complete search history.

(56) References Cited

U.S. PATENT DOCUMENTS 2,387,598 A * 10/1945 Mercier ..................... 222/386.5
3,199,726 A *  8/1965 Pierson ............................ 222/1
(Continued)

*Primary Examiner* — Donnell Long
(74) *Attorney, Agent, or Firm* — Kramer Levin Naftalis & Frankel LLP

(57) ABSTRACT

A composite container, comprising a form-retaining outer container comprising a neck, and a flexible inner container, the inner container comprising a dispensing opening mounted in the neck of the outer container is presented. The inner container is connected over a part of its surface area near the dispensing opening to a corresponding surface area of the inside of the outer container near the neck, via adhesive or weld connection, such that there remains a portion of the inner container not connected to the sidewall of the outer container. In response to an overpressure developed by a displacing medium introduced between the inner container and the outer container, a portion of the inner container that is not connected to the outer container moves at least one of: (i) towards the dispensing opening and (ii) within, the portion of the inner container that is connected to the outer container.

20 Claims, 18 Drawing Sheets

(51) Int. Cl.
  B29C 49/00 (2006.01)
  B29C 49/22 (2006.01)
  B29C 65/50 (2006.01)
  B29C 65/52 (2006.01)
  B29C 65/00 (2006.01)
  B65D 83/00 (2006.01)
  B29B 11/08 (2006.01)
  B29B 11/14 (2006.01)
  B29C 49/02 (2006.01)
  B29K 23/00 (2006.01)
  B29K 67/00 (2006.01)
  B29K 105/00 (2006.01)
  B29L 9/00 (2006.01)
  B29L 31/00 (2006.01)
  B67D 1/08 (2006.01)

(52) U.S. Cl.
  CPC  B29B 2911/1404 (2013.01); B29B 2911/1406 (2013.01); B29B 2911/1408 (2013.01); B29B 2911/1412 (2013.01); B29B 2911/1414 (2013.01); B29B 2911/14026 (2013.01); B29B 2911/14033 (2013.01); B29B 2911/1442 (2013.01); B29B 2911/14066 (2013.01); B29B 2911/14093 (2013.01); B29B 2911/14106 (2013.01); B29B 2911/14113 (2013.01); B29B 2911/14133 (2013.01); B29B 2911/14146 (2013.01); B29B 2911/14326 (2013.01); B29B 2911/14333 (2013.01); B29B 2911/14486 (2013.01); B29C 49/02 (2013.01); B29K 2023/12 (2013.01); B29K 2067/00 (2013.01); B29K 2105/258 (2013.01); B29L 2009/00 (2013.01); B29L 2009/001 (2013.01); B29L 2031/7156 (2013.01); B67D 2001/0827 (2013.01)

(56) References Cited

U.S. PATENT DOCUMENTS

| | | | | |
|---|---|---|---|---|
| 3,233,779 | A * | 2/1966 | Cornelius | 222/61 |
| 3,308,818 | A * | 3/1967 | Rutkowski | 604/69 |
| 3,339,803 | A * | 9/1967 | Wayne et al. | 222/95 |
| 4,308,973 | A * | 1/1982 | Irland | 220/495.01 |
| 5,301,838 | A * | 4/1994 | Schmidt et al. | 222/95 |
| 5,312,018 | A * | 5/1994 | Evezich | 222/95 |
| 5,332,121 | A * | 7/1994 | Schmidt et al. | 222/95 |
| 6,945,428 | B2 * | 9/2005 | Shimizu et al. | 222/105 |
| 6,945,429 | B2 * | 9/2005 | Gosis et al. | 222/105 |
| 7,325,702 | B2 * | 2/2008 | Lu | 222/1 |
| 7,753,239 | B2 * | 7/2010 | Chang | 222/394 |
| 7,913,876 | B2 * | 3/2011 | Muenzenberger et al. | 222/94 |
| 8,025,182 | B2 * | 9/2011 | Murayama et al. | 222/95 |
| 8,240,509 | B2 * | 8/2012 | Geiger | 222/95 |
| 2007/0262092 | A1 * | 11/2007 | Tyski | 222/209 |

* cited by examiner

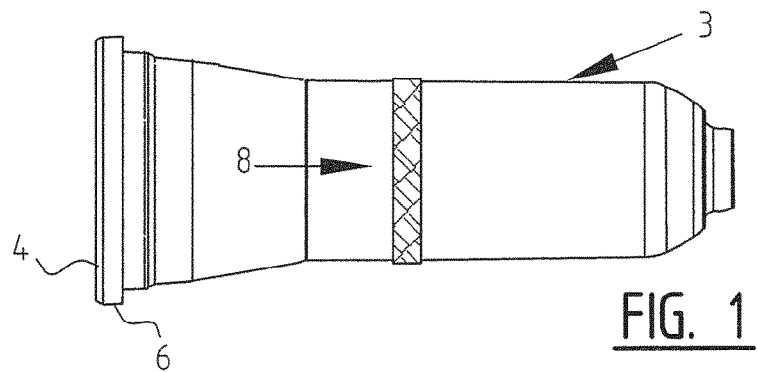
FIG. 1
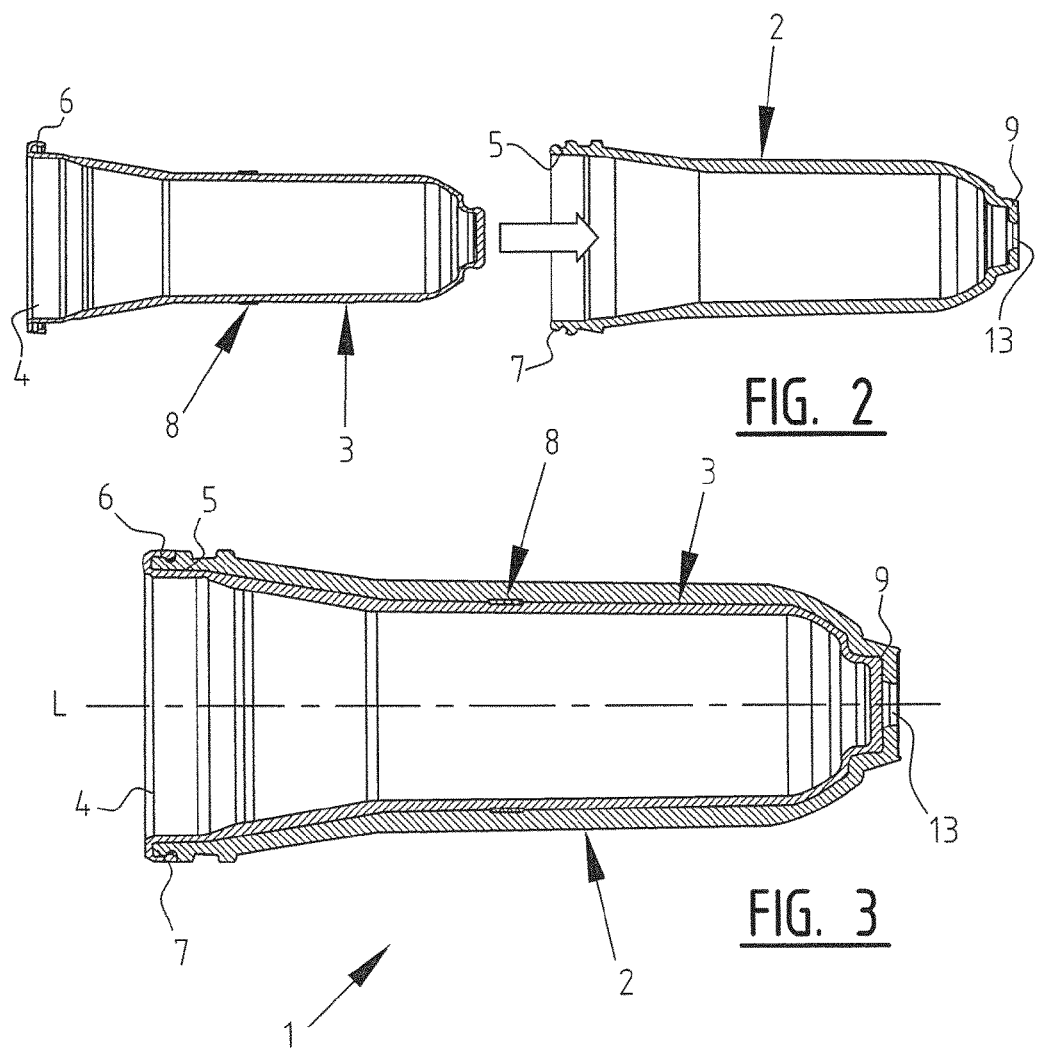
FIG. 2
FIG. 3

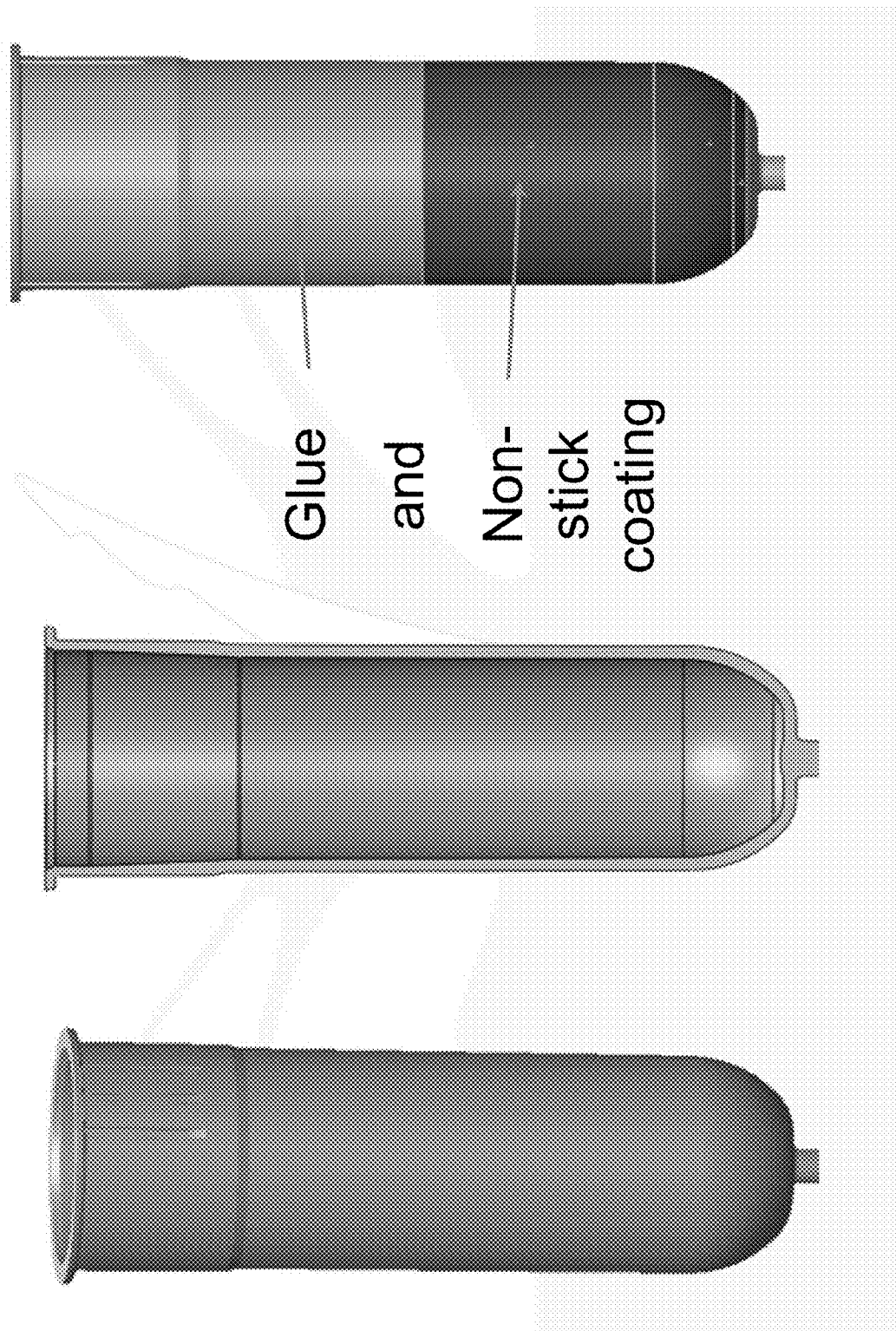
Fig. 21 - Piston Flair Inside Layer

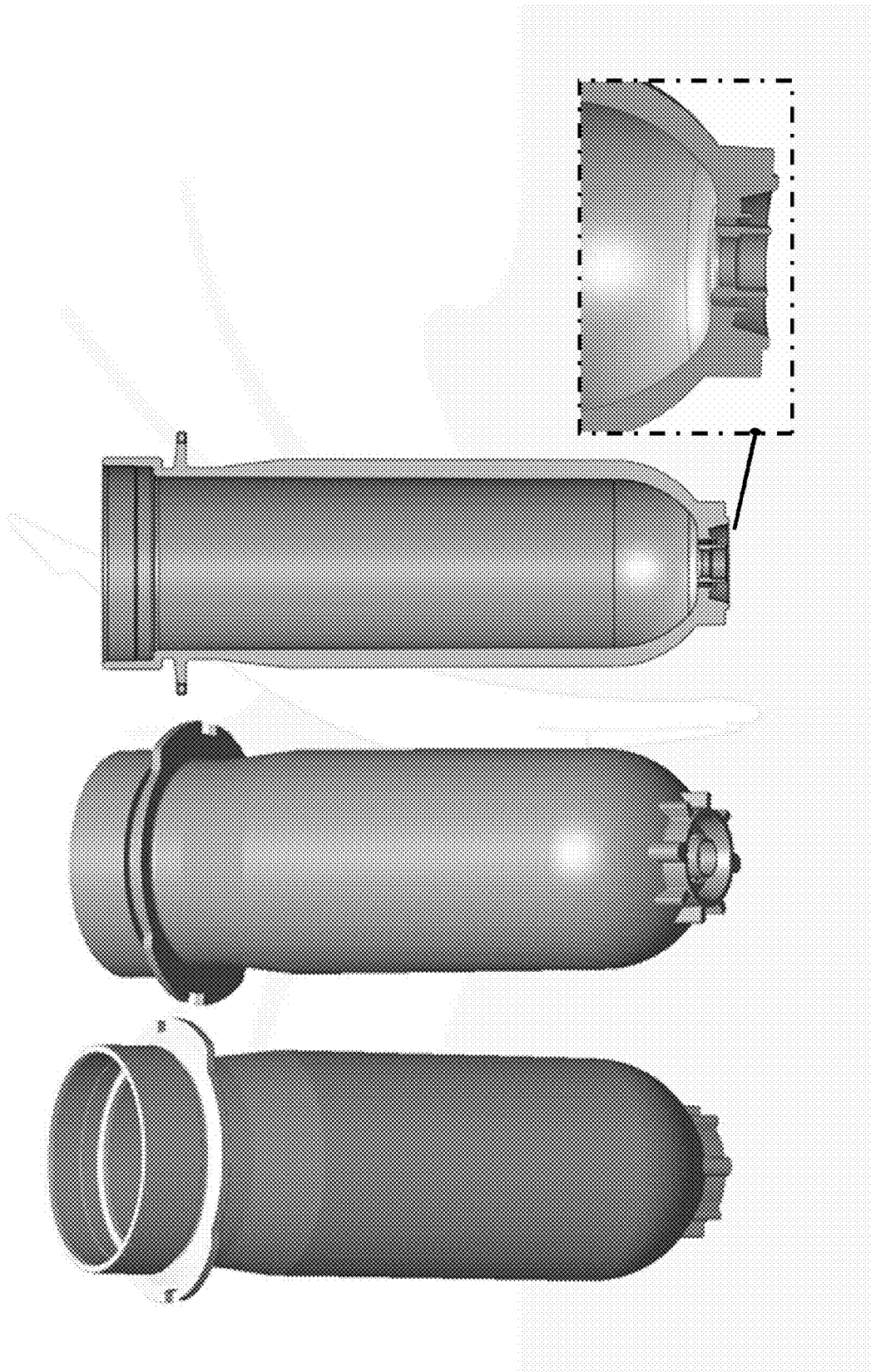
Fig. 22 - Standard Flair Outside Layer

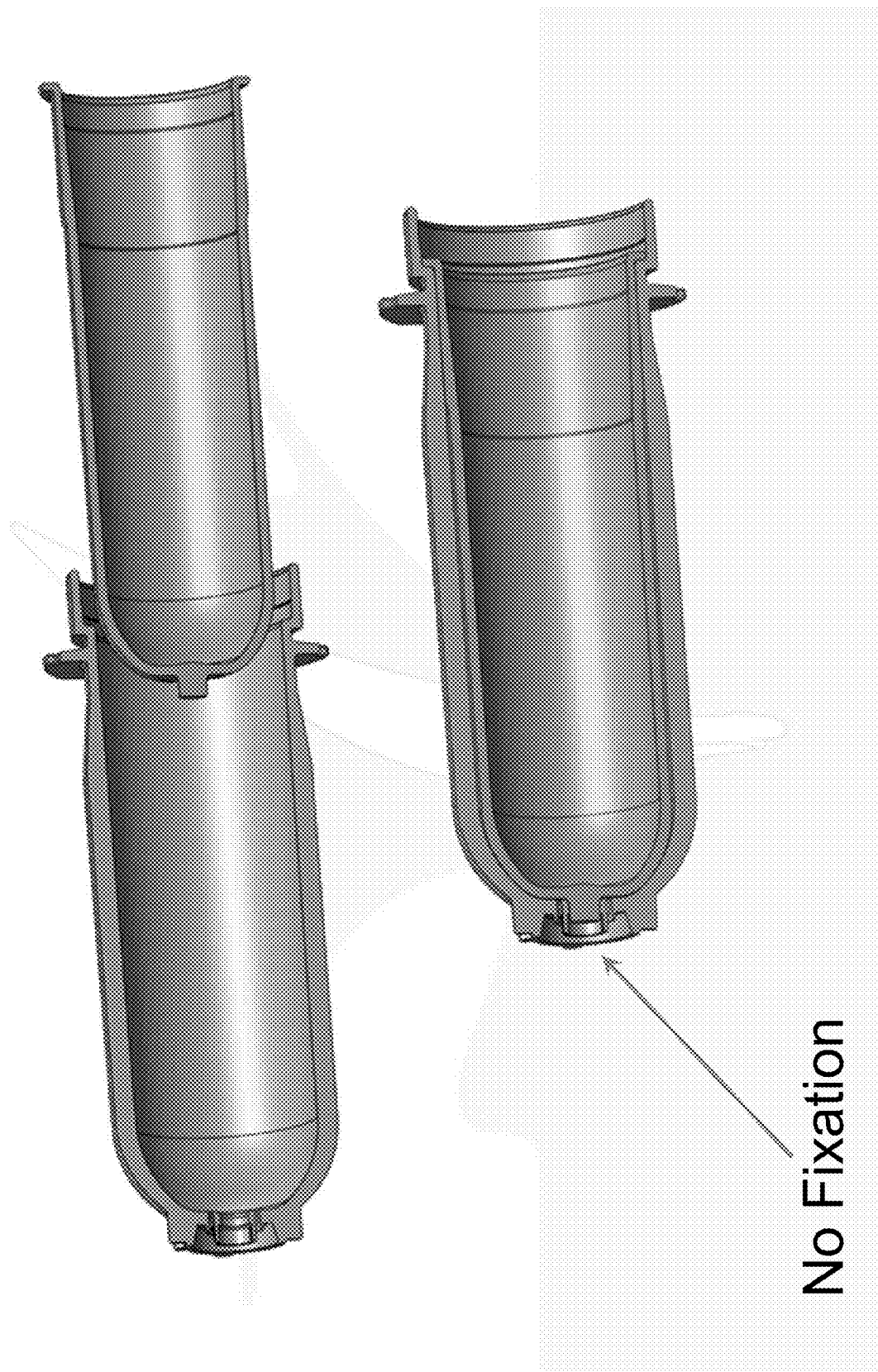

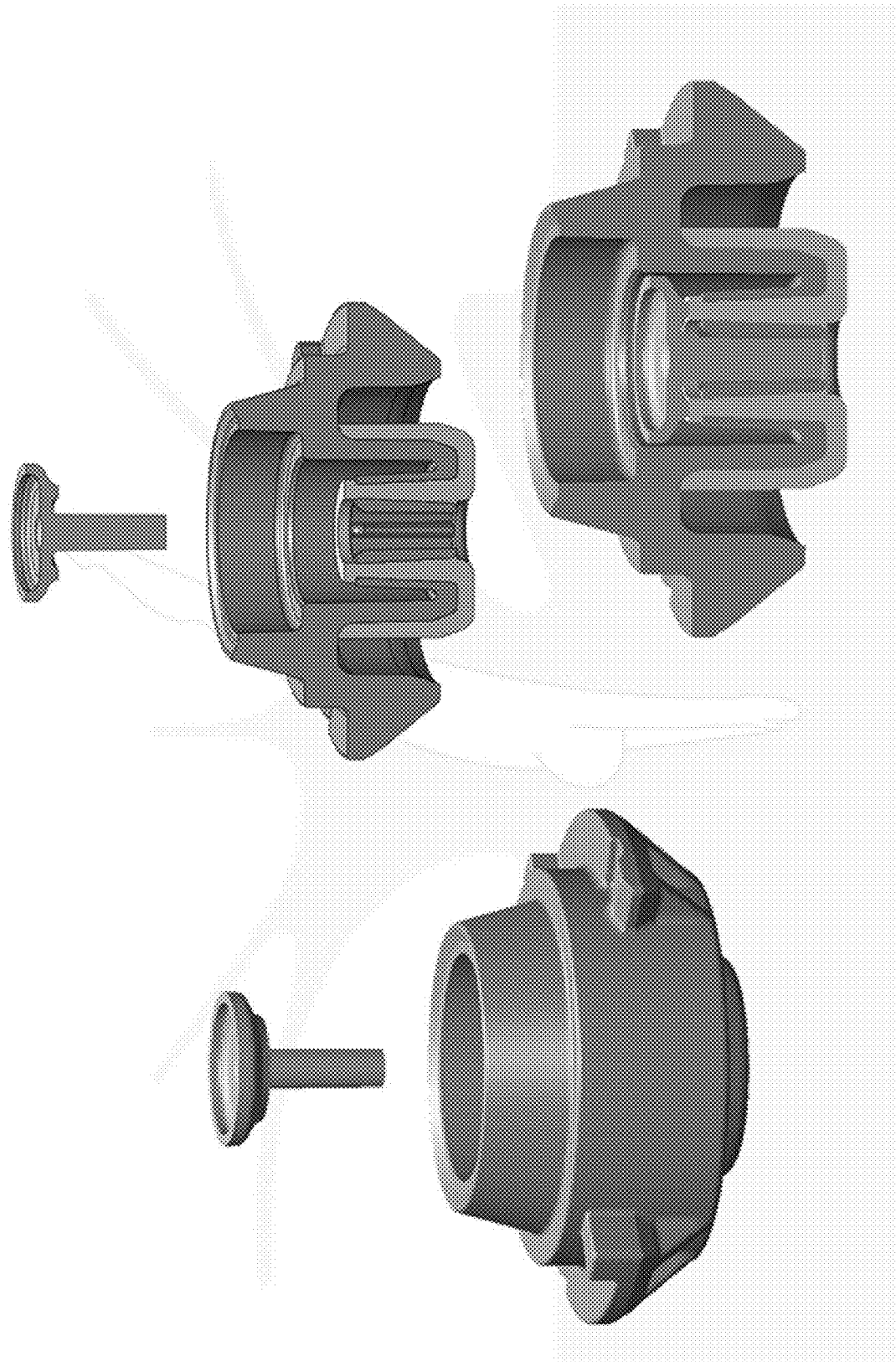
Fig. 24 - Air Valve in Power Connector

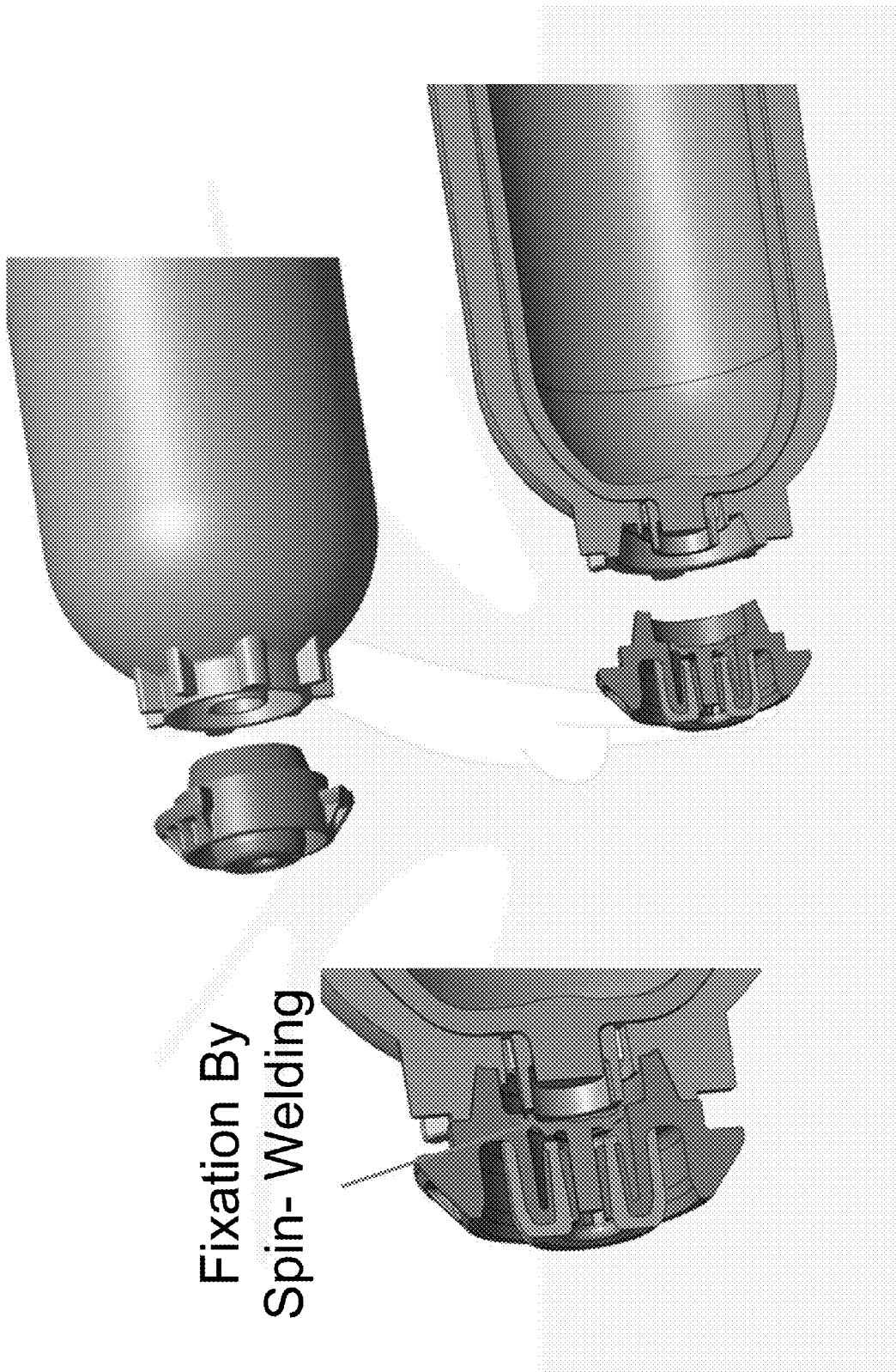
Fig. 25 - Power Connector Assembly

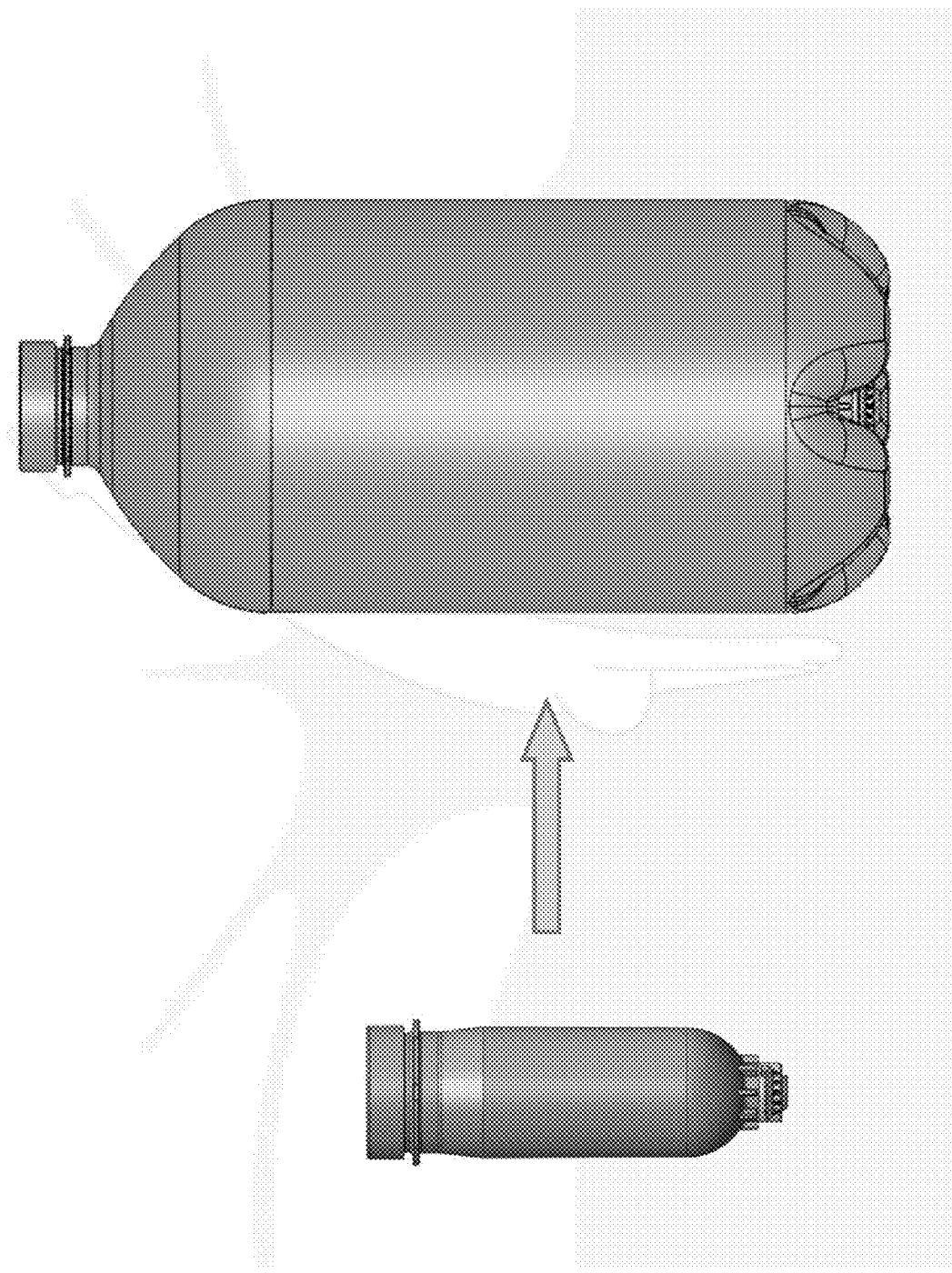

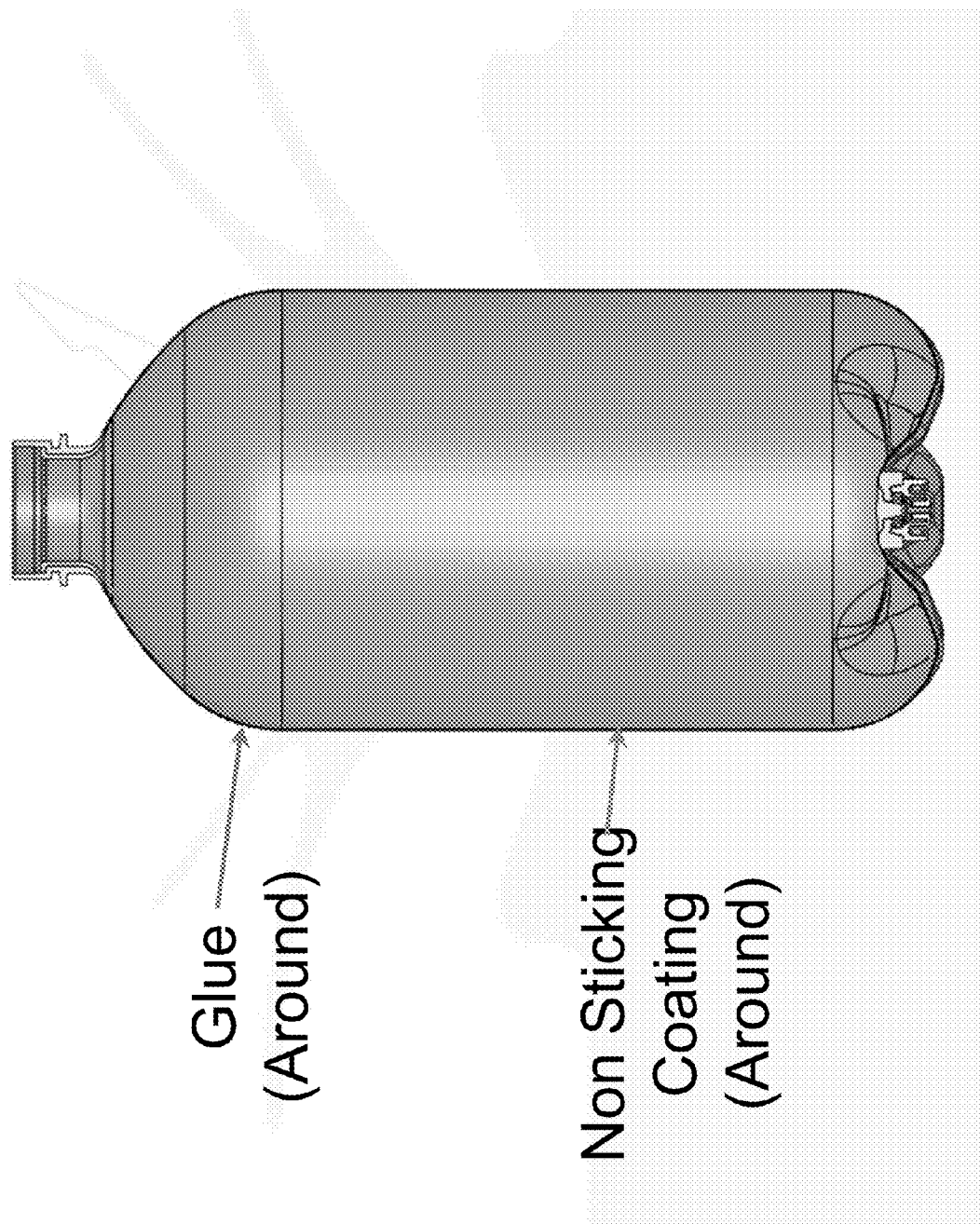

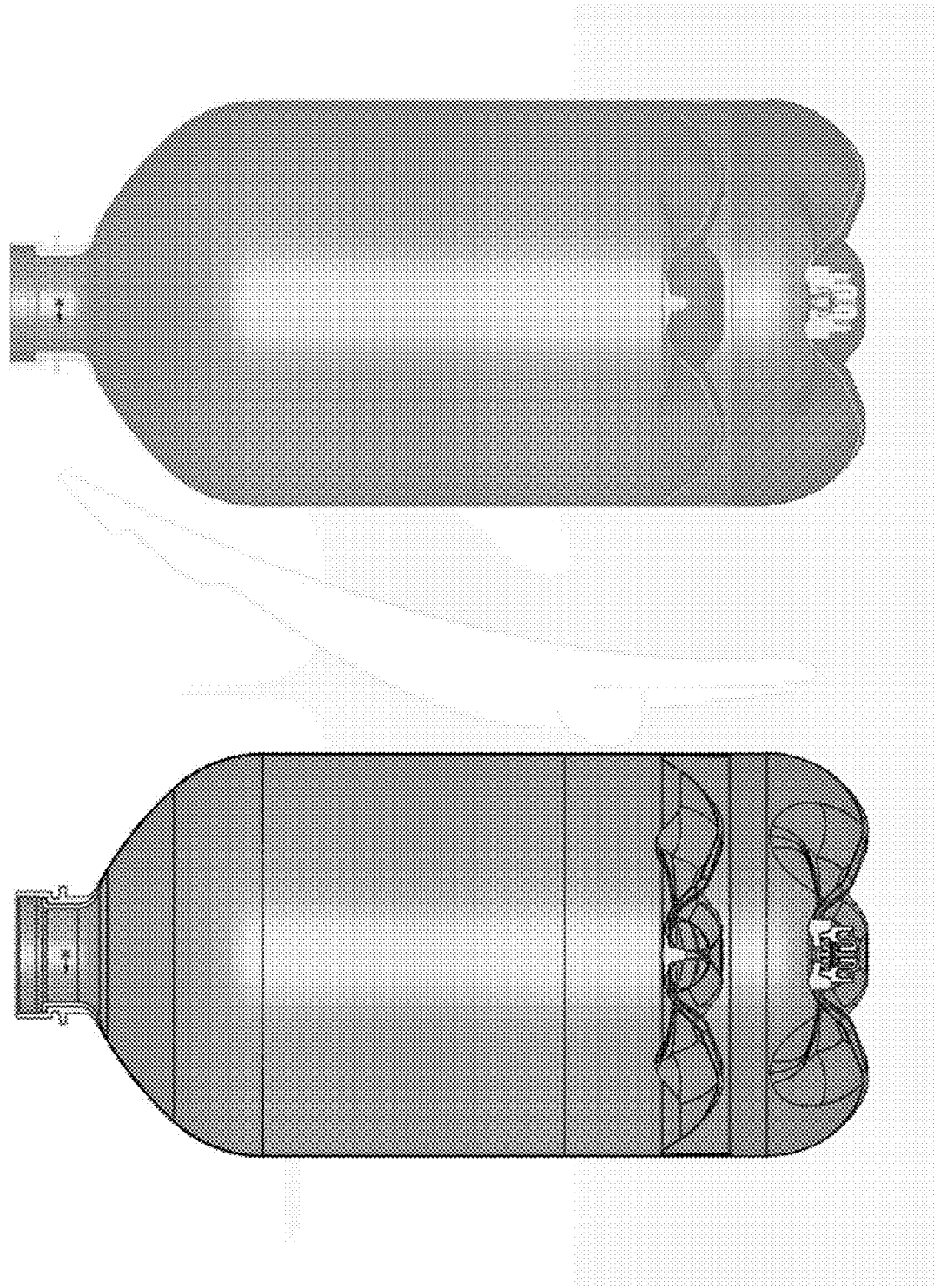
Fig. 28 - Step 1, Pressure From Bottom

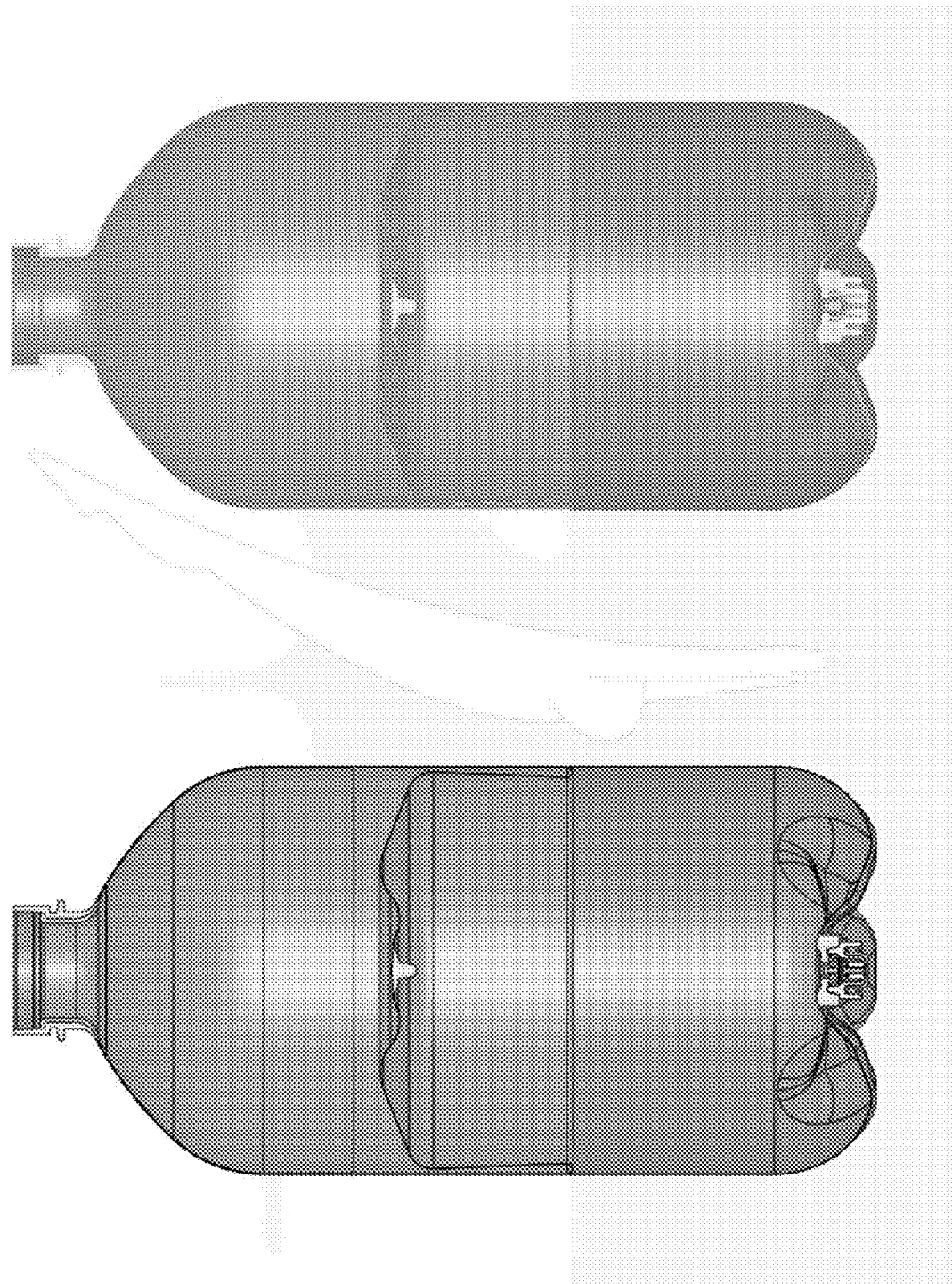
Fig. 29 - Step 2

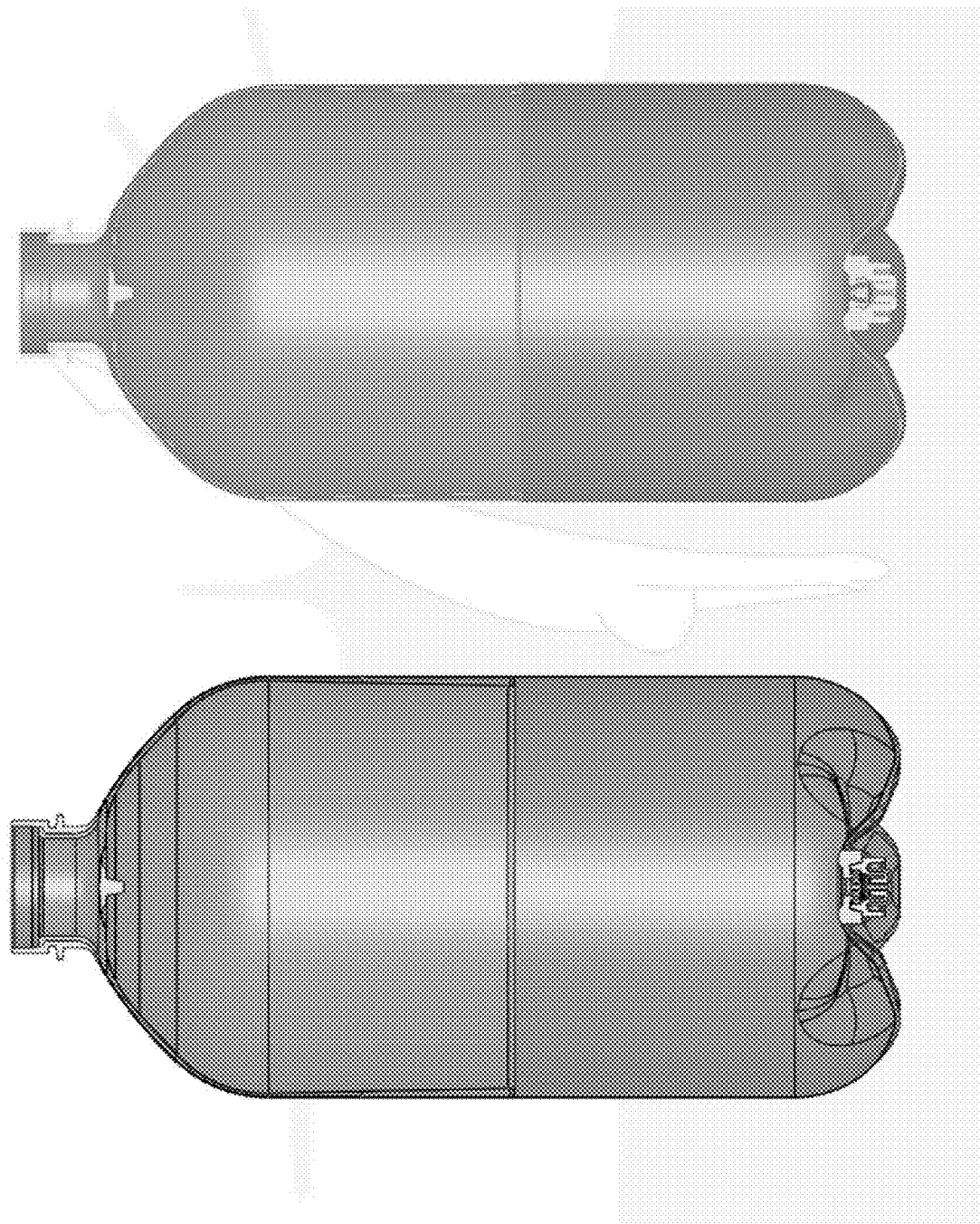
Fig. 30 - Step 3

COMPOSITE CONTAINER AND METHOD FOR MANUFACTURING SAME ("MULTI-LAYER PREFORM")

CROSS REFERENCE TO RELATED APPLICATIONS

This application is a continuation of U.S. application Ser. No. 12/803,845 filed Jul. 8, 2010, now allowed, which is a continuation-in-part of PCT/NL2009/000001, of which is hereby incorporated by reference in its entirety. PCT/NL2009/000001 was filed Jan. 8, 2009, and thereafter published as WO 2009/088285, on July 16. PCT/NL2009/000001 claimed priority to NL 1034895, filed on Jan. 8, 2008, which is also hereby incorporated herein by reference. Applicants hereby claim priority under 35 U.S.C. 119 to both (i) PCT/NL2009/00000 and to (ii) NL 1034895 (filed in The Netherlands).

TECHNICAL FIELD

The present invention relates to composite containers for dispensing of liquids and the like, and in particular to a glued multi-layer pre-form and methods of manufacturing and assembling such a multi-layer pre-form.

BACKGROUND OF THE INVENTION

Applicant has previously described composite containers comprising a form-retaining outer container and at least one flexible inner container, wherein the inner container has a dispensing opening mounted in a neck of the outer container, and wherein the at least one inner container is also connected over at least a part of its periphery to the outer container. Such a composite container was described by applicant, for example, in NL 1033582.

In such previous composite containers the outer container and the inner container were formed integrally by means of a two-component injection molding process, followed by heating and blowing, in what is known as a blow molding process. In such processes the inner container adheres to the inner surface of the outer container over its entire outer surface. Then, when a displacing medium such as air is forced between the two containers the connection between the inner container and the outer container was gradually broken. The flexible inner container was then gradually compressed, whereby the content thereof, generally a liquid or a paste, would be pressed out of the composite container through a dispensing opening.

What is needed in the art is an improved composite container that it is both easier to manufacture and from which dispensing of contents can be better controlled.

BRIEF DESCRIPTION OF THE DRAWINGS

In what follows, the present invention is described via a number of examples, wherein reference is made to the accompanying drawings, in which;

FIG. 1 depicts a side view of an inner container pre-form formed by injection molding after application of a ring of adhesive according to an exemplary embodiment of the present invention;

FIG. 2 shows a longitudinal section of how an exemplary inner container is inserted into an outer container also formed by injection molding;

FIG. 3 is a cross-section showing the inner and outer containers of FIGS. 1-2 as assembled;

FIGS. 13-20 depict cross-sections of an exemplary full-size container made from the pre-form of FIG. 17 during various stages of dispensing product;

FIG. 21 depicts views of an exemplary inner container pre-form according to yet another exemplary embodiment of the invention;

FIG. 22 depicts an exemplary outer container pre-form for use with the inner container pre-form of FIG. 21;

FIG. 23 depicts assembly of the inner and outer container pre-forms of FIGS. 21 and 22 to form a composite container pre-form;

FIG. 24 depicts an air valve and power connector for use with the composite container pre-form of FIG. 23;

FIG. 25 depicts affixation of the power connector of FIG. 24 to the composite container pre-form of FIG. 23 according to an exemplary embodiment of the present invention;

FIG. 26 shows the pre-form of FIG. 25 after inflation to bottle size according to an exemplary embodiment of the present invention; and FIGS. 27-30 depict cut-away views of the full size bottle of FIG. 26 during various stages of dispensing product according to an exemplary embodiment of the present invention.

SUMMARY OF THE INVENTION

Figure 4:
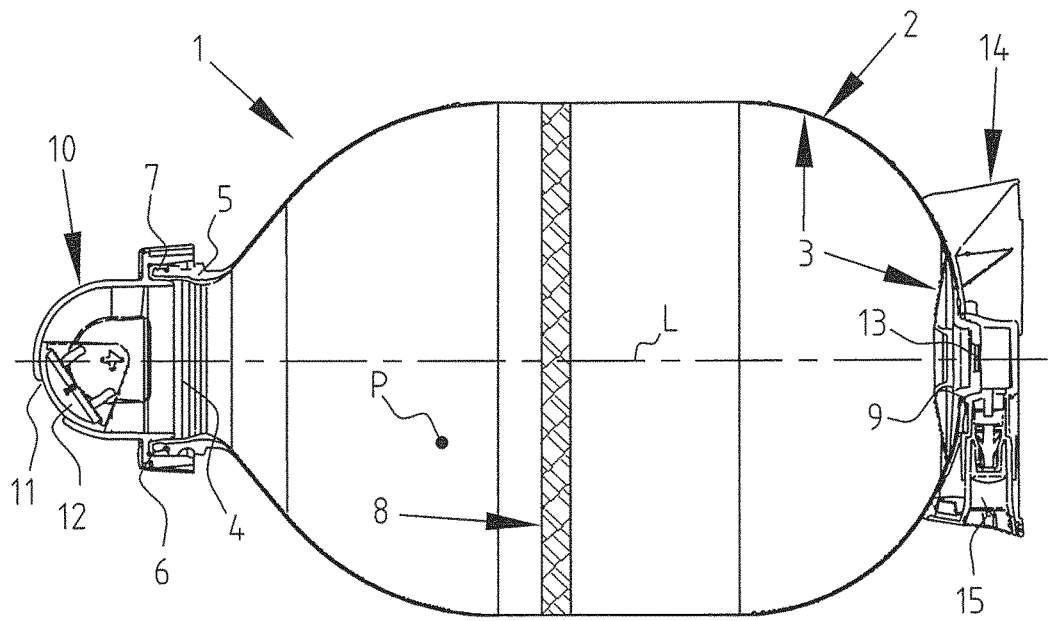
FIG. 4 depicts a cross-section through the composite container of FIG. 3 after inflation to its final form, being filled with a product for dispensing, closed with a dosing head and provided with a connecting member to a source of displacing medium.

A composite container, comprising a form-retaining outer container and a flexible inner container is presented. The inner container comprises a dispensing opening and can be mounted in a neck of the outer container, and the inner container is further connected to the outer container by an adhesive or weld connection over a portion of its periphery. The adhesive or weld connection can take the form of a ring adhesion or weld extending transversely to a central longitudinal axis of the container, or can cover the entire surface area of a defined portion of the respective inner container and outer container walls, such as, for example, the upper one-half of the container. The adhesion or weld can be substantially permanent, or alternatively, the adhesive or weld connection can be adapted to detach in controlled manner under the influence of pressures occurring in the container. Additionally, a method for manufacturing such a composite container is also presented, including forming a form-retaining outer container pre-form comprising a neck, forming a flexible inner container pre-form comprising a dispensing opening, inserting the inner container pre-form into the outer container pre-form and fixing said inner container pre-form to the neck of the outer-container pre-form. If the two containers are to be connected by adhesive, then prior to inserting the inner container pre-form into the outer container pre-form, a glue or adhesive can be applied either to the outer surface of the inner container pre-form or to the inner surface of the outer container pre-form, defining a portion of the surface area of the inner and outer containers where they will be connected. Once the two pre-forms are assembled, the composite container can be blown to full size under significant pressures, and the inner container becomes connected to the outer container over the defined portion of their periphery (e.g., their upper halves) by the adhesive spreading under such pressure, or by welding, into an air-tight seal. In exemplary embodiments of the present invention, the remaining portion of the inner container pre-form can be coated with an anti-stick coating prior to insertion into the outer container pre-form, so as to facilitate motion of the remaining portion of the flexible inner container relative to the outer container. In exemplary embodiments of the present invention, in operation, under pressure supplied by a displacing medium, the non-adhering portion of the inner container moves upwards within the outer container in a piston-like motion so as to dispense a product provided inside it, until it has completely folded on itself so that it its inner wall fully contacts the inner wall of the adhering portion of the inner container.

DETAILED DESCRIPTION OF THE INVENTION

In exemplary embodiments of the present invention, a composite container can be provided that has an adhesive or weld connection between the inner container and the outer container over a defined area of each of these containers. Such an adhesive or weld connection can be effected in a simple manner and can, if desired, be adapted to the desired release behavior without modification of either the properties or materials of either the inner container or the outer container.

In exemplary embodiments of the present invention a method for manufacturing such a composite container can be provided. Such a method can comprise, for example, (i) forming a form-retaining outer container pre-form comprising a neck; (ii) forming at least one flexible inner container pre-form comprising a dispensing opening; and (iii) inserting the at least one inner container pre-form into the outer container pre-form and fixing the inner container to the neck of said outer container; (v) wherein, after insertion in the outer container, the at least one inner container is connected to the outer container over a portion of its surface nearest to the neck of the outer container by means of adhesion or welding. Pre-forms can be formed by injection molding. A pre-form is a relatively thick-walled semi-manufacture which has roughly the form of a test tube.

If the connection between the two containers is via adhesive or glue, then such adhesive or glue can be applied to the outer surface of the inner container pre-form, or to the inner surface of the outer container pre-form, prior to insertion of the at least one inner container pre-form into the outer container pre-form. Once the two pre-forms are blown to full size, the pressure applied during the blowing operation spreads the adhesive uniformly between the two containers, and allows the adhesive or glue to form an air-tight seal.

Such an exemplary method can further include, for example, that the connection between inner container and outer container be essentially permanent. Such an exemplary method can further include, for example, that the inner container be connected to the outer container such that under an applied pressure the inner container will fold inside itself in a piston type motion. Such an exemplary method can still further include that the connection between the inner container and outer container is such that when the inner container folds inside itself in said piston type motion the portion of the inner container that is not connected to the outer container slides along the inside of the portion of the inner container whose outer all is connected to the outer container, but the portion of the inner container and outer containers that are connected remains in an air-tight seal.

FIG. 4 depicts an exemplary composite container according to an exemplary embodiment of the present invention. With reference thereto, composite container 1 comprises a form-retaining outer container 2 and a flexible inner container 3 inside it, which can be filled, for example, with a product P for dispensing. Product P can be, for example, a liquid, such as a beverage, a scented aromatic, or a condiment, or a gel or paste, such as, for example, a lubricant, toothpaste, caulking compound, or the like. Or, for example, a powder that has fluid or semi-fluid properties, such as for example, certain powdered lubricants. Inner container 3 can have, for example, a dispensing opening 4 which can be mounted in neck 5 of outer container 2. In the example shown in FIG. 4 dispensing opening 4 has a bent collar 6 which can be snapped around edge 7 of neck 5 for fastening. Inner container 3, which lies against the inner wall of outer container 2 over substantially its entire surface, can, for example, be further connected to outer container 2 by an adhesive connection 8 over at least a part of its periphery.

For example, adhesive connection 8 can take the form of an adhesive or welded ring. Such a ring can extend transversely to a longitudinal axis L of the container running from dispensing opening 4 to bottom 9. As shown in FIG. 4, adhesive or welded ring 8 can, for example, be provided approximately halfway between dispensing opening 4 and bottom 9, and can be designed to withstand the pressures which may develop in composite container 1 during dispensing of product P, and remain closed in an air-tight seal.

In exemplary embodiments of the present invention, dispensing opening 4 of inner container 3 (which also functions as the dispensing opening of the entire composite container), can be closed, for example, by dosing head 10 mounted thereon. Dosing head 10 can have a dosing opening 11 which can, for example, be closed by pivotable closure member 12.

Figure 5:
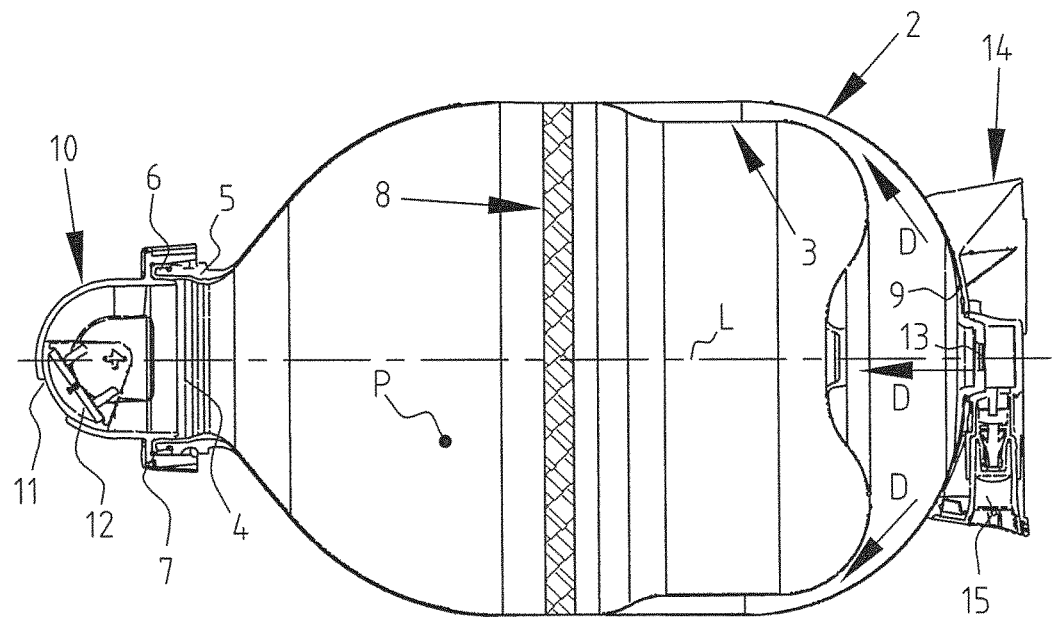
FIGS. 5-7 show cross-sections of the composite container of FIG. 4 during various different stages of dispensing product from the container.

In exemplary embodiments of the present invention, an opening 13 can be formed in the bottom of outer container 2, through which a displacing medium D, such as, for example, air, can be introduced between inner container 3 and outer container 2, as shown in FIG. 5. A connecting member 14 can be provided for this purpose, an opening 15 of which can, for example, be connected to a displacing medium source (not shown), such as, for example, an air pump, gas pump or other displacing medium introduction means.

In exemplary embodiments of the present invention, outer container 2 and inner container 3 can be formed separately, as pre-forms, by injection molding. Such pre-forms are next described with reference to FIGS. 1-3. The two pre-forms can be made from a variety of materials, and need not be made from the same material. For example, outer container 2 can be formed from polyethylene terephthalate (PET) and inner container 3 can be formed from polypropylene (PP). Or, for example, both the inner container and the outer container can be formed from the same material, such as either PET or PP, or, for example using other polyolefins.

With reference to FIG. 1, after the inner container pre-form has been injection molded, adhesive 8 can be arranged around the inner container pre-form 3, after which this pre-form can be inserted into the outer container pre-form 2, as shown in FIG. 2, and fixed therein as shown in FIG. 3. Alternatively, the adhesive can be provided on the inner surface of the outer container pre-form 2 and then the two pre-forms affixed. Such affixation can be effected mechanically, such as, for example, by clicking collar 6 fixedly around edge 7, as well as chemically, such as for example, via an adhesive connection such as, for example, adhesive 8. The combined pre-forms can then, for example, be heated to a temperature so that they become soft. Such temperature can be, for example, between the glass temperature and the melting temperature of the plastics used. In this soft state, the composite container can then be blown into its final shape in a mold. The pressure under which the pre-forms are blown, for example, between 25-40 bar, spreads out the adhesive that was applied to the inner container (or the outer container) between them in a uniform and thin layer, making for an air-tight seal.

Figure 6:
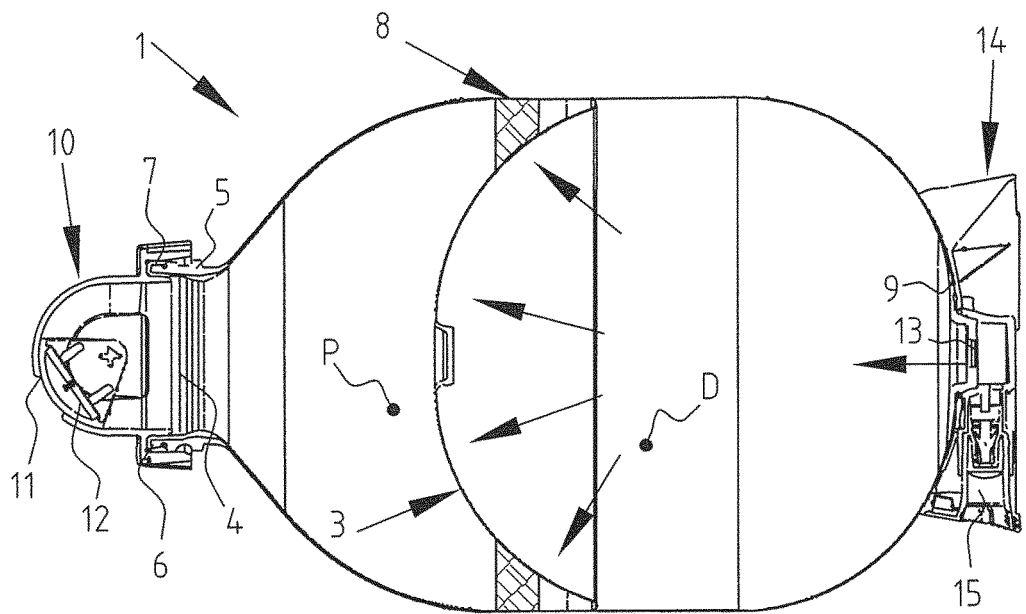
Figure 7:
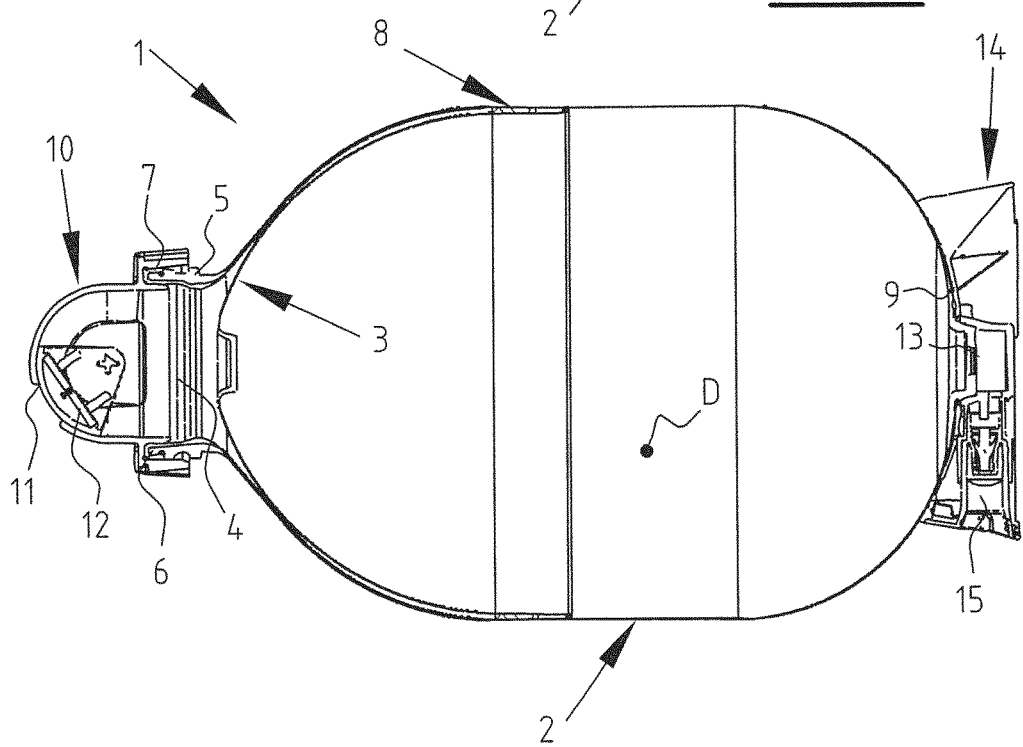
Figure 8:
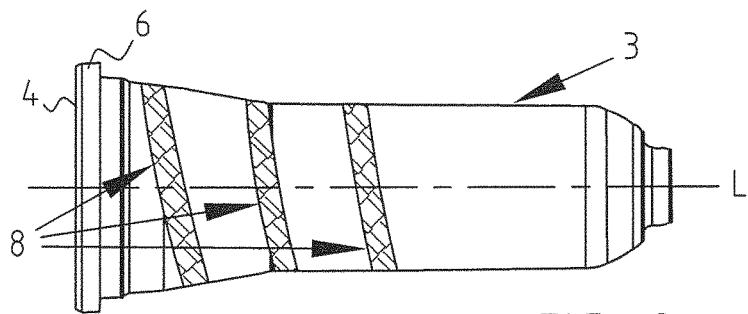
FIG. 8 is similar view of an inner container pre-form as shown in FIG. 1 after application of adhesive according to an alternate exemplary embodiment of the invention.
Figure 9:
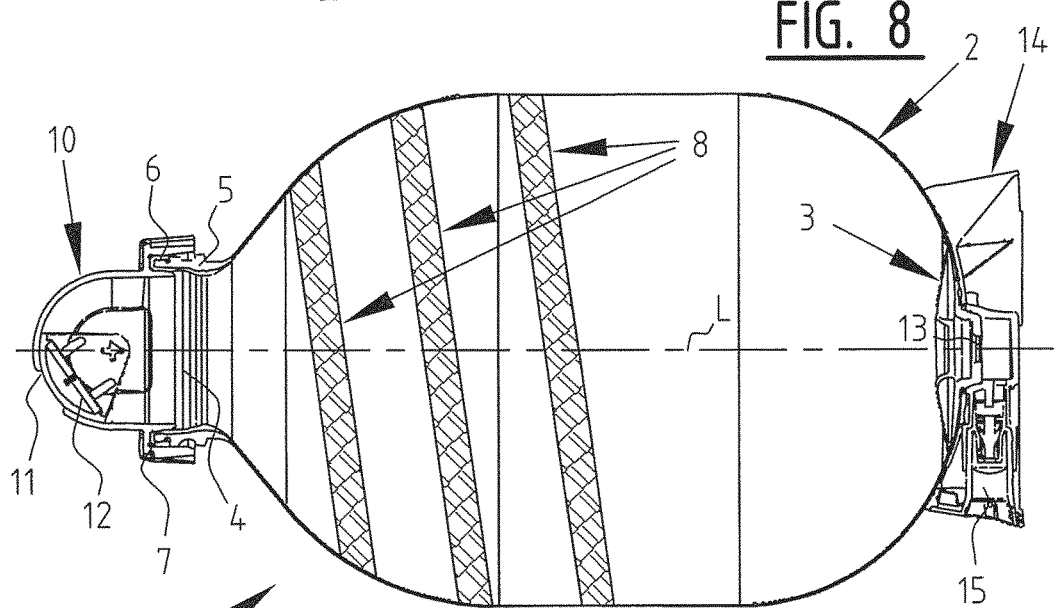
FIG. 9 depicts a cross-section through a composite container made from the inner container pre-form of FIG. 1 after inflation to its full size, being filled with a product for dispensing, closed with a dosing head and provided with a connecting member to a source of displacing medium.
Figure 10:
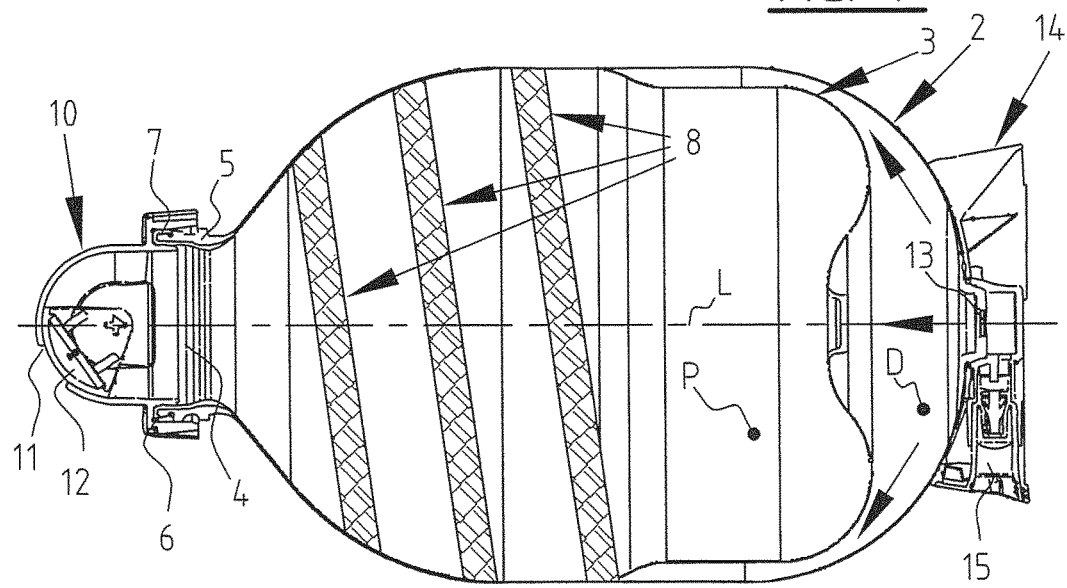
FIGS. 10-12 show cross-sections of the composite container of FIG. 9 during various different stages of dispensing a product from the container.

As shown in FIGS. 5-6, when composite container 1 is used for the dosed dispensing of a product P, a displacing medium D can, for example, be introduced into the space between inner container 3 and outer container 2 via connecting member 14 and opening 13. Pressure can then be developed in inner container 3 so that the product P will flow out of inner container 3, for example, as soon as closure member 12 is used to open an opening 11 in dosing head 10. The presence of the adhesive between the two containers 8 ensures that, from, for example, the top of to roughly halfway down the container, inner container 3 remains adhered over its entire periphery to outer container 2 in an air-tight seal, so that displacing medium D does not come near the vicinity of dispensing opening 4. Inner container 3 can thus be uniformly emptied from bottom 9 and can further be prevented from being pressed closed from pressures applied at its sides, whereby product P could become "trapped" due to a closing or crimping of inner container 3 at the top (where the diameter is smaller, and thus the resistance to pressure less), leaving the product P under such a closure or crimping of the inner container stuck in the inner container. Because adhesive connection 8 is designed to withstand the pressures occurring when inner container 3 is being pressed (both from the displacing medium introduced at the bottom as well as by, for example, a user squeezing the outer surfaces of the outer container 2), inner container 3 will fold inside itself up above adhesive connection 8, as shown in FIGS. 6 and 7.

It is noted that in the various figures the adhesive connection is shown as a strip or a helix-like series of strips, for ease of illustration. While glue or adhesive may be applied in this fashion at the perform stage, once the composite container is blown to full size, as noted, the adhesive or glue spreads between the two containers over the entire surface area of the desired connection in a thin coating. As this is hard to depict, the "strips" continue to be shown in the figures for the full size blown-up containers, albeit shown as wider to illustrate the spreading out process. In exemplary embodiments of the present invention there are not, generally, areas between the two containers that are only adhering along "strips." The two containers actually adhere over the entire surface area of the desired connection (e.g., from the top to about half-way down).

Figure 11:
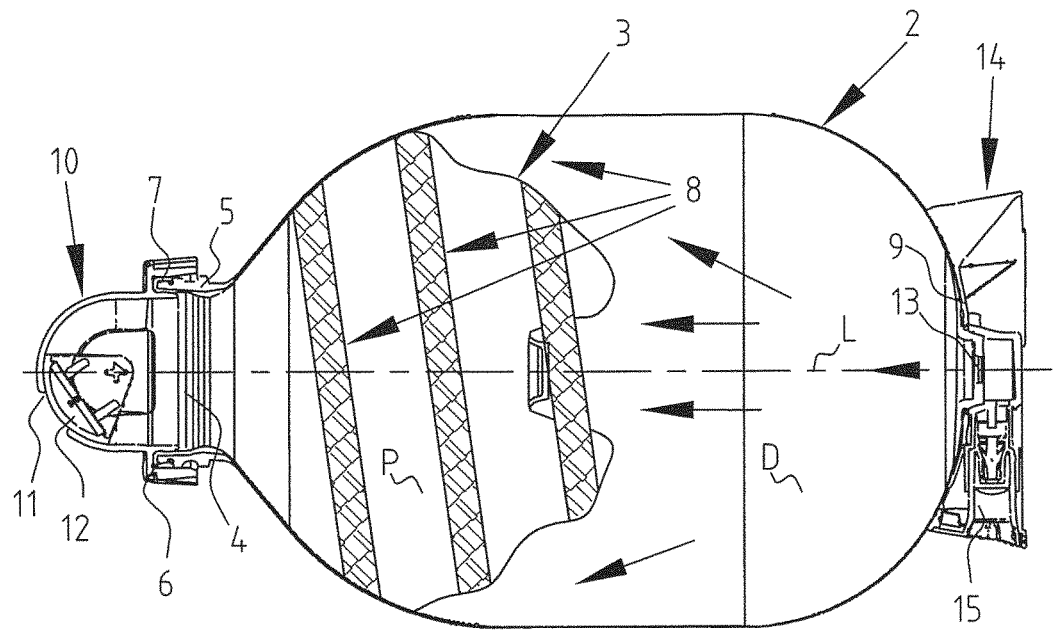
Figure 12:
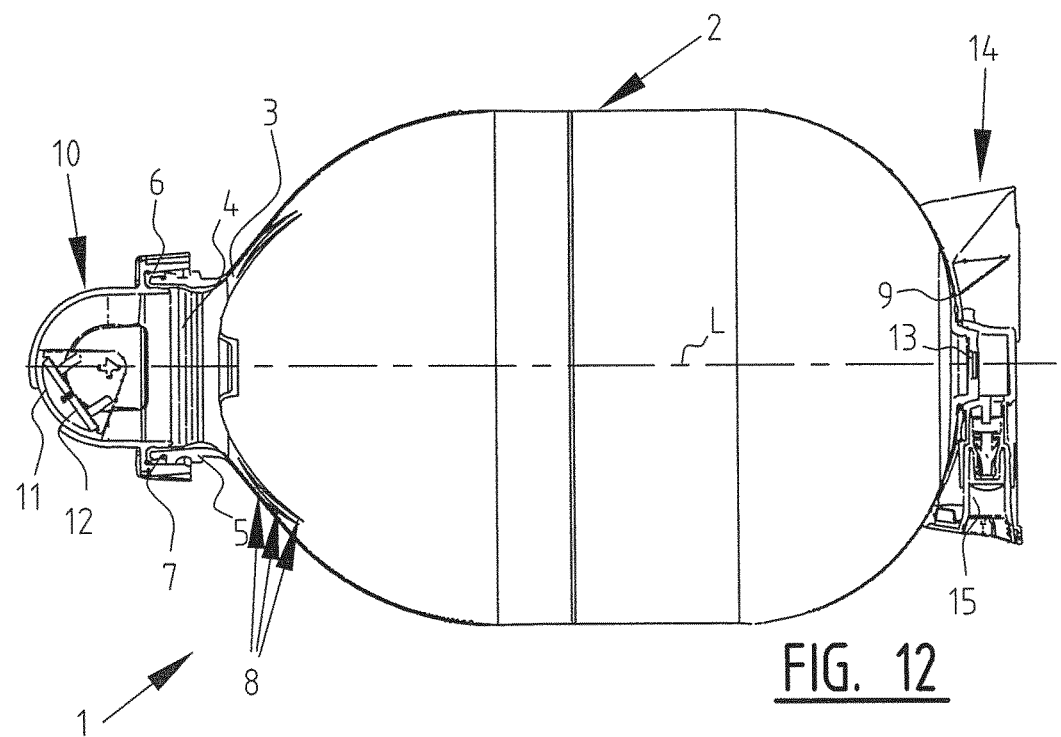

In alternative exemplary embodiments of the present invention adhesive connection 8 can be adapted to detach in a controlled manner under the influence of pressures occurring in container 1. Thus, in such exemplary embodiments, when product P is dispensed by introducing displacing medium D under pressure, inner container 3 would not fold on itself as shown in FIGS. 6-7, but rather, in such alternate exemplary embodiments, inner container 3 would be gradually pulled away from the side wall of outer container 2 as a result of adhesive connection 8 detaching, and thus the inner container shrinks both width-wise and length-wise as product P is dispensed. This alternate exemplary embodiment is shown in FIGS. 11-12.

Figure 13:
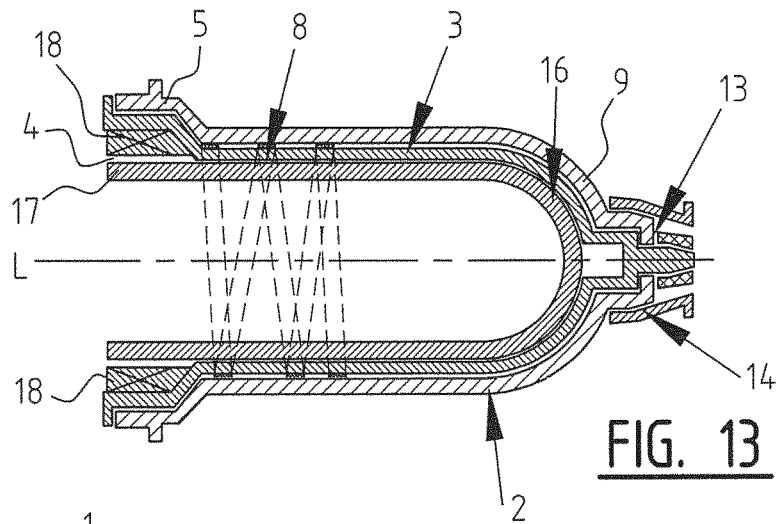
FIG. 13 is a cross-section showing exemplary pre-forms of two inner and one outer containers as assembled according to an exemplary "two product" embodiment of the present invention.

In yet another exemplary embodiment according to the present invention, a composite container suitable for simultaneously dispensing two products P1 and P2 can be provided. In such exemplary embodiments, a second inner container 16 can be provided inside first inner container 3, which can be, for example, connected to outer container 2 by means of an adhesive connection 8 as shown in FIG. 13 (dotted lines). Such secondary inner container 16 can also have a dispensing opening 17, which can be mounted in a random manner in dispensing opening 4 of primary inner container 3 (random, in the sense of no particular rotational orientation being required between secondary inner container dispensing opening 17 and primary inner container dispensing opening 4).

Also arranged between dispensing opening 4 of primary inner container 3 and dispensing opening 17 of secondary inner container 16 can be, for example, a number of ribs 18, which can, for example, be peripherally distributed and which can, for example, maintain a number of clear passages between the two inner containers 3 and 16. In this manner primary inner container 3 can be filled with product P1 to be dispensed therefrom, as shown in FIGS. 14, and P1 can then in turn be dispensed from the container.

Figure 14:
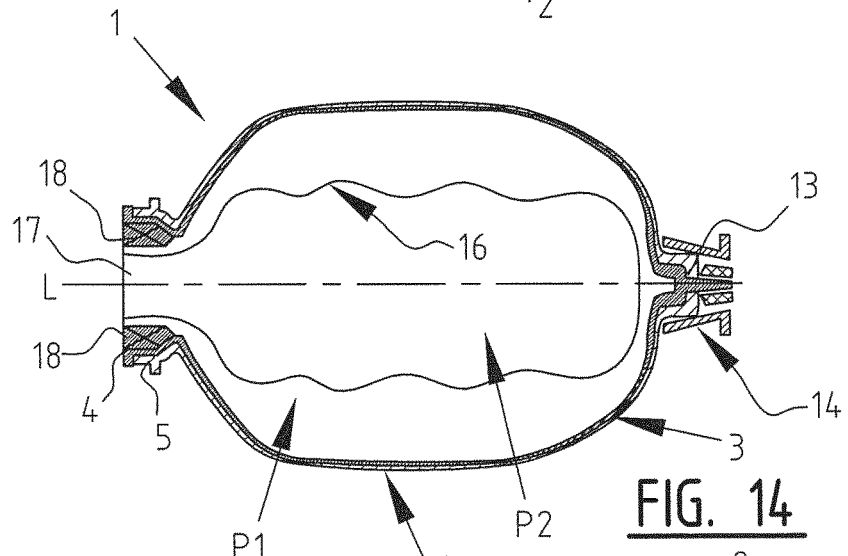
FIG. 14 shows a cross-section through a composite container made from the assembled pre-form of FIG. 13 after inflation to its full size and being filled with two products for dispensing.
Figure 15:
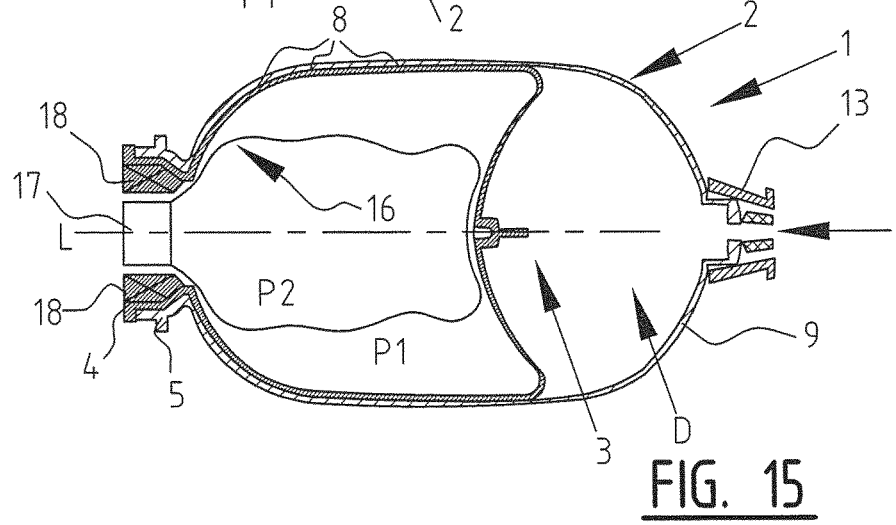
FIG. 15 depicts the composite container of FIG. 14 during dispensing of the two products from the two inner containers.

During use of the exemplary "two-product" composite container 1 of FIGS. 14-15, a displacing medium D can, for example, be introduced into the space between outer container 2 and primary inner container 3, whereby primary inner container 3 is brought under pressure. As a result, secondary inner container 16 is simultaneously also placed under pressure. This is because Product P1 in primary inner container 3 functions as a displacing medium for secondary inner container 16. When the dosing head (not shown) is opened, both products P1 and P2 can be simultaneously dispensed from composite container 1, as shown in FIG. 15. For example, there are toothpastes that are currently dispensed in two components from a two-compartment tube. One of the components is a standard toothpaste with a whitener, the other a mouthwash containing gel, often colored blue or green (to suggest "minty-ness" "cool taste" or "freshness"). The gel component tends to be of lower viscosity than the toothpaste component. In exemplary embodiments of the present invention such a compound toothpaste can, for example, be dispensed using the "two-product" composite container of FIGS. 13-15. It is noted that product P1 can, for example, be the less viscous product and P2, relatively speaking, the more viscous product. In that approach, P1 will not push over P2 at the top of the bottle and potentially cutoff, or crimp, the flow of P2 out of its dispensing opening 17.

Figure 16:
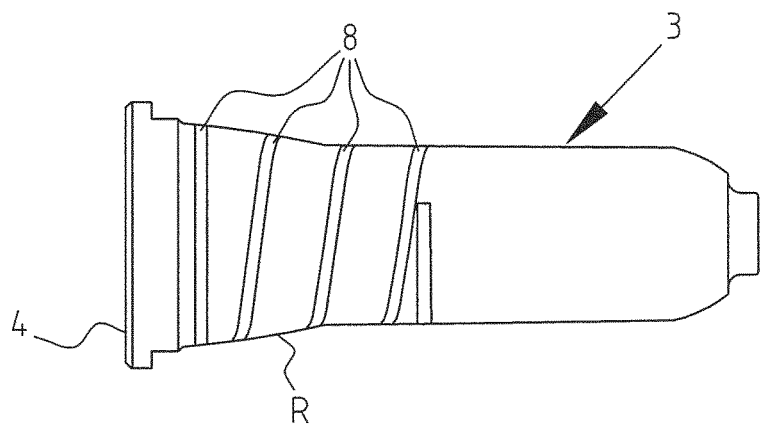
FIG. 16 depicts an inner container pre-form with adhesive applied according to yet another exemplary embodiment of the invention.

In still an alternate exemplary embodiment according to the present invention, an adhesive or glue can be applied to an inner perform in a spiral manner around the part of inner container 3 situated closest to dispensing opening 4 (e.g., around the upper half of the composite container), as shown in FIG. 16. In addition, at the position where the adhesive is provided, inner container 3 can also have a recess in its outer surface in which the adhesive can be received. Such a recess can, for example, be formed by reducing the wall thickness or, for example, by displacing the entire wall slightly inward.

Figure 17:
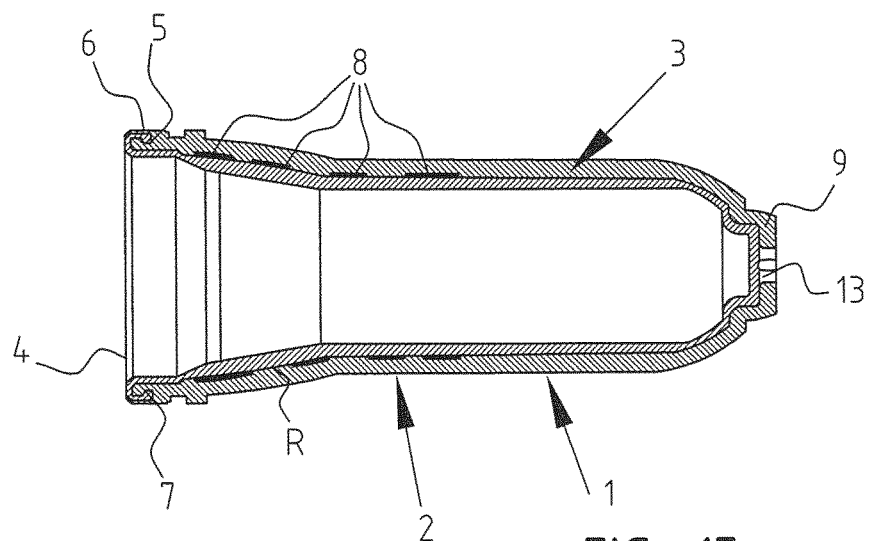
FIG. 17 depicts a composite container pre-form comprising the inner container pre-form of FIG. 16 where the adhesive has begun to spread within the recess.
Figure 18:
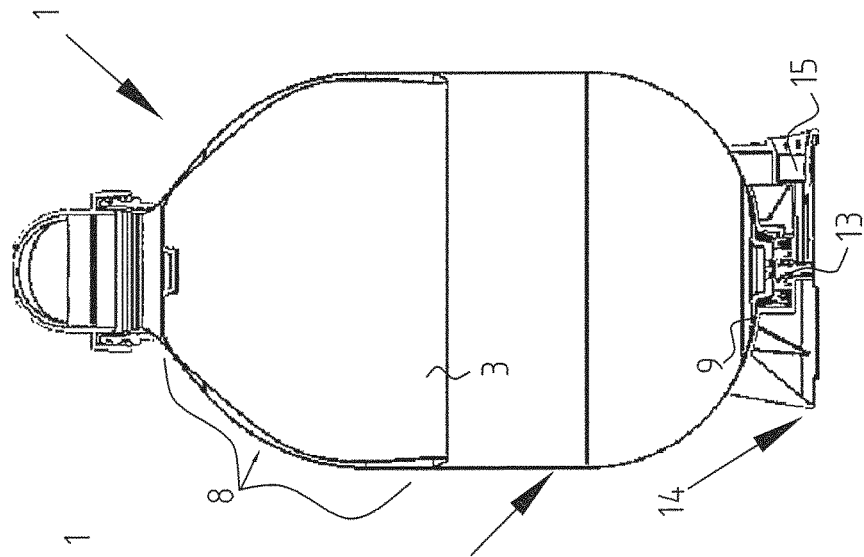
Figure 19:
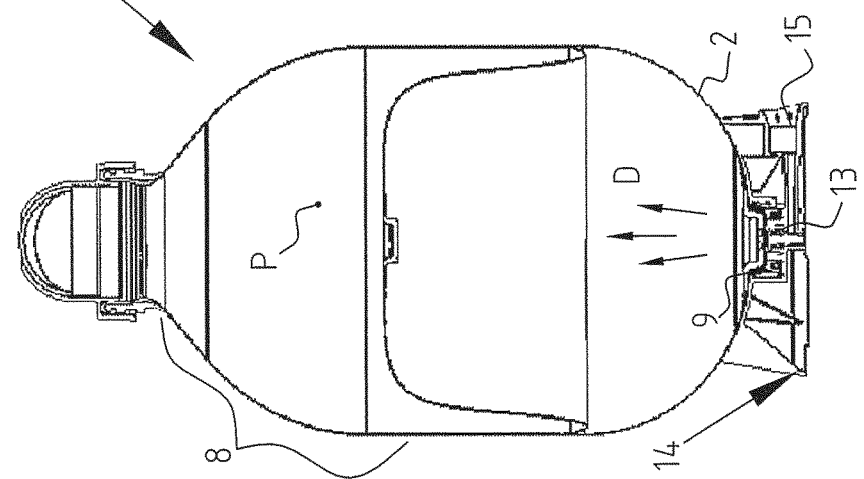

In such exemplary embodiments, when inner container 3 is pressed into outer container 2 during manufacture, adhesive strip 8 is spread and distributed over the entire recess R—as shown schematically by the greater width of strip 8 in FIG. 17 (see increased width of black lines relative to strip width as shown in FIG. 16). Despite the fact that the recessed portions of the outer wall of inner container 3 do not directly lie against the inner wall of outer container 2, a good connection can nevertheless be formed between inner container 3 and outer container 2. This is important for good heat transfer during the blow molding of inner and outer containers 2 and 3. During such blow molding the already spread adhesive layer can, for example, be distributed even further under the influence of the high pressure (for example, on the order of 30 bar or more), so that a uniform connection can be formed over a considerable part of the contact surface between inner container 3 and outer container 2—and not just where the original adhesive strips were placed as shown in FIG. 16.

Figure 20:
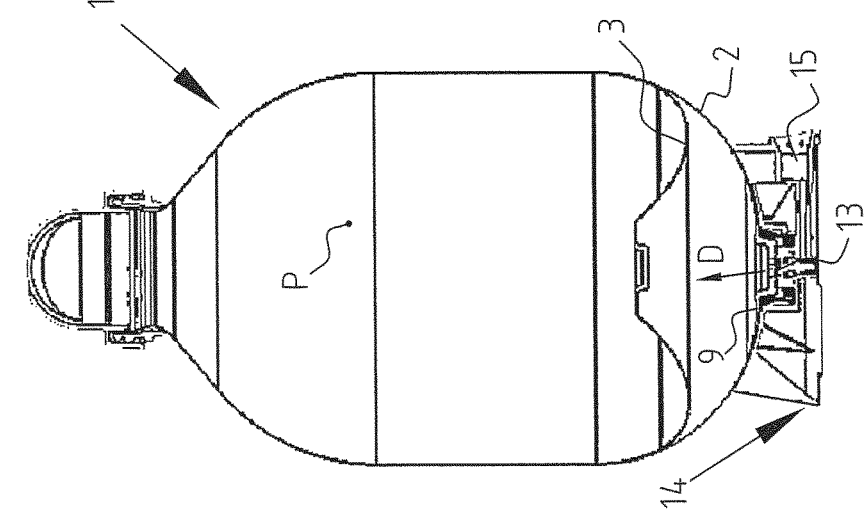

It is noted that in such "recessed wall" exemplary embodiments, as well as in the "two-liquid" exemplary embodiments of FIGS. 13-15, and the basic exemplary embodiment of FIGS. 4-7, adhesive connection 8 is not intended to detach in a controlled manner as described in connection with the exemplary embodiment of FIGS. 8-12. Rather, in all such exemplary embodiments, adhesive connection 8 must provide an airtight seal, and withstand the pressures which develop when displacing medium D is pressed into composite container 1. Displacing medium D is thus prevented from being able to penetrate between inner container 3 and outer container 2 in the vicinity of dispensing opening 4. As described above regarding previous embodiments (FIGS. 4-7), inner container 3 then folds inside itself in a piston type motion, and its non-adhering portion eventually comes to lie inside and along its adhering portion, as shown in FIG. 20.

FIGS. 21-30 depict an enhanced exemplary embodiment according to the present invention, where an anti-stick coating is used for the non-adhering portions of the two containers, in addition to a glue or adhesive being used to connect the adhering portions. Thus, FIG. 21 depicts an inner container, where the upper half has glue applied to it, and the lower half has a non-stick coating applied to it. As noted, the glue or adhesive is applied to a pre-form, and can, for example, be applied to the outer surface of the inner container pre-form (as shown in FIG. 21) or, alternatively, to the inner surface of the outer container pre-form. The anti-stick coating can be a variety of materials, such as, for example, silicone oil, olive oil, etc. FIG. 22 depicts a corresponding outer container, and, in the magnified portion at the bottom right of FIG. 22, shows the details of the central seat and air/displacing medium passages to the sides of the seat. Finally, FIG. 23 shows the two containers being and as assembled, where the pin at the bottom of the inner container, although seated in the seat, is not affixed to the outer container at the bottom, as described above, so that the inner container can move upwards in the piston like motion, as described in connection with FIGS. 27-30 below. It is noted that the outer container shown in FIG. 22 can also be used in exemplary devices which do attach the inner container at the seat, and as here, where the inner container is not attached at the seat. An example of the use of such an outer container pre-form in devices which do connect the inner and outer containers at the bottom seat, is described in U.S. Provisional patent application Ser. No. 61/398,484, filed on Jun. 25, 2010, entitled INTEGRATED ONE-PAK FLAIR, inventors Wilhelmus Johannes Joseph Maas and Petrus Lambertus Wilhelmus Hurkmans, which is under common assignment herewith (Applicants reserve the right to amend this application to supply the correct provisional serial number when available). In such devices, in order to introduce a displacing medium, the openings at the side of the seat are needed. Where the inner container is free to move upwards and is not fixed, as in FIG. 23, other designs are possible. Thus, in exemplary embodiments of the present invention the passages to the side of the central seat of the outer container can be modified, or removed, as may be desired.

FIG. 24 depicts an air valve provided in a power connector, for controlling the flow of a displacing medium between the inner and outer containers. This valve-power connector assembly can be affixed to the bottom of the composite container pre-form of FIG. 23 by spin welding, for example, as shown in FIG. 25.

FIG. 26 depicts the completed composite container pre-form of FIG. 25 being transformed to a normal full-size bottle, via blow molding, for example.

FIGS. 27-30 are cut-away views depicting various stages of dispensing product from a full size composite container. The outer container is shown in orange, and the top portion (a semi-cylinder) has been cut away to show the inner container, shown in blue inside the back semi-cylinder of the outer container, shown in orange.

FIG. 27 depicts the composite container where the inner container is full of product, and none has been dispensed, a so-called "Step 0." The upper portion of the inner container is glued to the inside wall of the outer container, while there is an anti-stick coating covering the bottom portion of the inner container's outside wall, thus facilitating its upward movement relative to the outer container. It is noted that the glue shown in FIGS. 21 and 27 is accurately shown, as a full coating of glue or adhesive spread or sprayed over the surface area of the inner container that is to be connected to the outer container, here shown as extending over more than the top half of the containers.

It is noted that such glue or adhesive can conveniently be applied to a pre-form by spraying, either preferably via an automatic spraying machine, or alternatively, by hand. Such glue or adhesive can also be applied manually by dispensing form a tube, for example, or using other known means. As noted above, once the composite container pre-forms are assembled, as in FIG. 23, when they are heated and blown to full size, as depicted in FIG. 26, the pressure of the blowing process, which can be, for example, between 25-40 bar, causes the glue to spread evenly between the two containers across the entire surface area of the desired connection in a very thin layer (much thinner than the thickness of the glue layer as applied to the pre-form).

As noted, instead of using glue or adhesive, the two containers of the composite container can also be welded, such as, for example, via laser, ultrasonic, or the like. Such welding can occur after the pre-forms have been blown to full size. If technology is, or becomes, available so as to conveniently weld the two containers as pre-forms, that can, for example, be alternatively done, and then be followed by the blowing step.

FIG. 28 shows an initial dispensing step, where pressure is applied from the bottom of the container, causing the inner container to move upwards, its inner wall sliding along itself. FIG. 29 shows a second dispensing step, a bit below an approximate midpoint in the dispensing process, where the inner wall of the inner container continues to move upwardly. In the shown configuration, the upward motion of the inner container has not yet reached the height of the bottle where the inner container is glued to the inner wall of the outer container. Here the pressure has caused the bottom of the inner container to be turned "outside in", and the depressions in the bottom of the inner container have thus smoothed out under the applied pressure. As noted, no air enters between the inner container and outer container where the two have been glued (or elded, via laser, ultrasonic, or the like as the case may be), because, in exemplary embodiments of the present invention, the glue or weld of the two containers provides an air-tight seal.

Finally, FIG. 30 shows a final step in the dispensing process. Here the bottom portion (approximately somewhat less than half of the container surface) of the inner container has completely folded inside itself, and all product has been pushed out through the opening at the top of the container. The only portion of the inner container still touching the inner wall of the outer container is that portion to which the glue was applied, and thus the inner container is approximately half glued to the outer container and approximately half folded inside itself, and all product is easily pushed out. In exemplary embodiments of the present invention the line separating the glued form the non-glued portions of the container can be more than, or even less than, half way down, as may be desired in various circumstances, however, such line being slightly below the half way point can, for example, ensure that there is always sufficient free inner container to provide the piston effect and push the product up and out of the container.

Thus, in exemplary embodiments of the present invention a composite container can be formed in a relatively simple manner, and such a composite container can be used to dispense a product, or multiple products, uniformly by means of a displacing medium, without the product ever coming into contact with the displacing medium. In exemplary embodiments of the present invention such a composite container can be highly suitable for dispensing food products. In exemplary embodiments of the present invention such a composite container can have its inner container glued over approximately its upper half to the inner wall of the outer container, and the lower half of the inner container can have a non-stick coating applied, to facilitate its upward piston-like motion relative to the outer container as pressure is applied by the displacing medium.

Although the invention has been described with reference to a number of exemplary embodiments, it will be apparent to those skilled in the art that the invention is not limited thereto. The inner container and/or the outer container can thus, for example, be manufactured from various other materials than those exemplary materials discussed above, and can, in particular, comprise multiple layers. The form and dimensions of each of the inner and outer containers could also be varied, such as, for example, to provide a plurality of inner containers in a single outer container adjacently to, instead of nested in, one another. The adhesive connection between the (primary) inner container(s) and outer container can also, for example, be differently formed, it is, for example, possible to envisage arranging a number of adhesive strips distributed over the periphery running parallel to the longitudinal axis. Such strips could either form a permanent connection, around which the inner container can fold, or could, for example, gradually detach. Further, it is possible to envisage a weld connection being formed between the inner container and the outer container as opposed to an adhesive connection. Thus, the scope of the invention is therefore defined solely by the following claims.

What is claimed is:

1. A composite container, comprising:
a form-retaining outer container comprising a neck;
a flexible inner container, the inner container comprising a dispensing opening mounted in the neck of the outer container,
wherein the inner container is further connected over a part of its surface area near the dispensing opening to a corresponding surface area of the inside of the outer container near the neck, via an adhesive or weld connection,
wherein there remains a portion of the inner container not connected to the sidewall of the outer container,
and wherein, in operation, in response to an overpressure developed by a displacing medium introduced between the inner container and the outer container, a portion of the inner container that is not connected to the outer container moves at least one of: (i) towards the dispensing opening and (ii) within, the portion of the inner container that is connected to the outer container.

2. The composite container of claim 1, wherein at least one of:
the adhesive or weld connection is a weld, via laser or ultrasonic; and
the adhesive or weld connection creates an air-tight seal.

3. The composite container of claim 1, wherein at least one of:
the adhesive or weld connection extends substantially over the whole periphery of a defined outer surface area of the inner container nearest the dispensing opening, and
the adhesive or weld connection can withstand pressures occurring in the container.

4. The composite container of claim 1, wherein at least one of:
the adhesive or weld connection takes the form of at least one adhesive strip or weld extending substantially parallel to or at a non-right angle to a longitudinal axis running from the dispensing opening to an opposite bottom of the container;
the adhesive or weld connection is arranged substantially halfway between the dispensing opening and the bottom of the container; and
the adhesive or weld connection covers an area of the inner container between the dispensing opening and substantially halfway between the dispensing opening and the bottom of the container.

5. The composite container of claim 1, wherein, in response to the overpressure developed by a displacing medium introduced between the inner container and the outer container, the portion of the inner container not connected to the outer container folds inside itself so that the inner wall of the portion of the inner container not connected to the outer container substantially covers the inner wall of the portion of the inner container that remains connected to the outer container.

6. The composite container of claim 1, further comprising a secondary inner container provided within the inner container.

7. The composite container of claim 1, wherein the inner container and the outer container are each preformed as injection-molded parts and, after the adhesive or weld connection has been realized, are brought into their final form by blow molding.

8. The composite container of claim 1, wherein at least one of a product and a liquid is provided in the inner container for dispensing.

9. The composite container of claim 6, wherein at least one of a product and a liquid is provided in each of the inner container and in the secondary inner container for dispensing.

10. The composite container of claim 6, wherein in operation at least one of:
(i) two products are dispensed, a first product from the inner container, and a second product from the secondary inner container, and
(ii) two products are dispensed, a first product from the inner container, and a second product from the secondary inner container, wherein the first product is less viscous than the second product.

11. A method for manufacturing a composite container, comprising:
forming a form-retaining outer container comprising a neck,
forming a flexible inner container comprising a dispensing opening,
providing the inner container in the outer container, and
providing an opening in the outer container, arranged to connect to an overpressure source, said opening in fluid communication with a gap between the inner container and the outer container; and
connecting the inner container over a part of its surface area near the dispensing opening to a corresponding inner surface area of the outer container near the neck, via an adhesive or weld connection, leaving a portion of the inner container not connected to the sidewall of the outer container,
wherein said portion of the inner container not connected to the outer container is arranged, under an overpressure, to move towards the dispensing opening and within the portion of the inner container that is connected to the outer container.

12. The method as claimed in claim 11, wherein at least one of:
the adhesive or weld connection extends substantially over the whole periphery of a defined outer surface area of the inner container nearest the dispensing opening,
the adhesive or weld connection can withstand pressures occurring in the container, and
at least one adhesive strip, adhesive compound, or weld is arranged between the inner container and the outer container.

13. The method of claim 11, wherein at least one of:
the adhesive or weld connection takes the form of at least one adhesive strip or weld extending substantially parallel to or at a non-right angle to a longitudinal axis running from the dispensing opening to an opposite bottom of the container;
the adhesive or weld connection is arranged substantially halfway between the dispensing opening and the bottom of the container;
the adhesive or weld connection covers an area of the inner container between the dispensing opening and substantially halfway between the dispensing opening and the bottom of the container; or
the adhesive or weld connection is formed substantially over the whole periphery of the upper surface area of the inner container.

14. The method of claim 11, wherein, for an adhesive connection, an adhesive strip or adhesive compound is arranged on the inner container before the inner container is provided within the outer container.

15. The method of claim 11, wherein a secondary inner container is provided within the inner container.

16. The method of claim 11, wherein the outer container and the inner container are formed by injection molding.

17. The method of claim 15, wherein after being adhered to each other or welded together, the outer container, the inner container and the secondary inner container are brought into their final form by blow molding.

18. The method of claim 11, further comprising filling the inner container with at least one of a product and a liquid to be dispensed.

19. The method of claim 15, further comprising filling each of the inner container and the secondary inner container with at least one of a product and a liquid be dispensed.

20. The method of claim 17, further comprising, prior to said blow molding, providing a nonstick coating between at least a part of the portion of the inner container not connected to the outer container and a corresponding portion of the outer container.

* * * * *